United States Patent
Koh et al.

(10) Patent No.: US 11,075,400 B2
(45) Date of Patent: Jul. 27, 2021

(54) LITHIUM-SULFUR BATTERY

(71) Applicant: LG CHEM, LTD., Seoul (KR)

(72) Inventors: Dongwook Koh, Daejeon (KR); Doo Kyung Yang, Daejeon (KR); Intae Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 164 days.

(21) Appl. No.: 16/328,998

(22) PCT Filed: Sep. 15, 2017

(86) PCT No.: PCT/KR2017/010131
§ 371 (c)(1),
(2) Date: Feb. 27, 2019

(87) PCT Pub. No.: WO2018/093032
PCT Pub. Date: May 24, 2018

(65) Prior Publication Data
US 2019/0198913 A1  Jun. 27, 2019

(30) Foreign Application Priority Data

Nov. 21, 2016 (KR) .................. 10-2016-0154858

(51) Int. Cl.
*H01M 10/052* (2010.01)
*H01M 10/058* (2010.01)
(Continued)

(52) U.S. Cl.
CPC ......... *H01M 10/052* (2013.01); *H01M 4/136* (2013.01); *H01M 4/5815* (2013.01);
(Continued)

(58) Field of Classification Search
None
See application file for complete search history.

(56) References Cited

U.S. PATENT DOCUMENTS 6,280,882 B1 * 8/2001 Vallee .................. H01M 6/181
429/303
2002/0187398 A1 * 12/2002 Mikhaylik .......... H01M 4/0402
429/234
(Continued)

FOREIGN PATENT DOCUMENTS

JP    2005-71998 A    3/2005
JP    2005-1421556 A  6/2005
(Continued)

OTHER PUBLICATIONS

JP Office Action dated Aug. 24, 2020 detailing the rejection utilizing reference JP 2005-142156 (translation and copy provided from Global Dossier file). (Year: 2020).*

(Continued)

*Primary Examiner* — Amanda J Barrow
(74) *Attorney, Agent, or Firm* — Birch, Stewart, Kolasch & Birch, LLP.

(57) ABSTRACT

A lithium-sulfur battery in which a passivation film having a semi-interpenetrating polymer network (semi-IPN) structure is formed on an electrode to improve lifespan characteristics of high-loading lithium-sulfur batteries.

11 Claims, 3 Drawing Sheets (51) Int. Cl.
*H01M 4/62* (2006.01)
*H01M 4/58* (2010.01)
*H01M 10/42* (2006.01)
*H01M 4/136* (2010.01)
*H01M 50/409* (2021.01)

(52) U.S. Cl.
CPC ......... *H01M 4/626* (2013.01); *H01M 10/058* (2013.01); *H01M 10/42* (2013.01); *H01M 50/409* (2021.01); *Y02E 60/10* (2013.01); *Y02T 10/70* (2013.01)

(56) References Cited

U.S. PATENT DOCUMENTS

| | | |
|---|---|---|
| 2004/0076885 A1* | 4/2004 | Sato .................. H01M 10/052 429/303 |
| 2005/0042515 A1 | 2/2005 | Hwang et al. |
| 2005/0095504 A1* | 5/2005 | Kim .................. H01M 4/1395 429/246 |
| 2012/0315545 A1 | 12/2012 | Son et al. |
| 2013/0252074 A1* | 9/2013 | Hsiao .................. H01M 10/425 429/159 |
| 2014/0186522 A1 | 7/2014 | Woo et al. |
| 2014/0220427 A1 | 8/2014 | Yu et al. |
| 2014/0220451 A1 | 8/2014 | Yu et al. |
| 2014/0255780 A1* | 9/2014 | Mikhaylik ............ H01M 4/622 429/213 |
| 2014/0295242 A1* | 10/2014 | Kimura ............... H01M 2/1072 429/120 |
| 2014/0321093 A1* | 10/2014 | Pande ...................... G03F 7/32 361/807 |
| 2015/0010815 A1 | 1/2015 | Chung et al. |
| 2015/0349310 A1* | 12/2015 | Viner .................... H01M 4/134 429/126 |
| 2015/0349380 A1 | 12/2015 | Manthiram et al. |
| 2017/0179468 A1* | 6/2017 | Fanous ............. H01M 10/0525 |
| 2017/0309917 A1* | 10/2017 | Lee ......................... H01M 4/13 |

FOREIGN PATENT DOCUMENTS

| | | |
|---|---|---|
| KR | 10-2002-0018393 A | 3/2002 |
| KR | 10-0497251 B1 | 6/2005 |
| KR | 10-2009-0053468 A | 5/2009 |
| KR | 10-2012-0135808 A | 12/2012 |
| KR | 10-1351846 B1 | 1/2014 |
| KR | 10-2014-0086811 A | 7/2014 |
| KR | 10-2015-0006327 A | 1/2015 |
| KR | 10-2015-0056122 A | 5/2015 |
| KR | 10-2015-0106253 A | 9/2015 |
| KR | 10-1633966 B1 | 6/2016 |
| KR | 10-1641763 B1 | 7/2016 |

OTHER PUBLICATIONS

Jenkins et al, "Glossary of basic terms in polymer science (IUPAC Recommendations) 1996," Pure and Applied Chemistry, vol. 68, No. 12, pp. 2287-2311, 1996 (Year: 1996).*
International Search Report for PCT/KR2017/010131 (PCT/ISA/210) dated Jan. 11, 2018.
European Search Report for Appl. No. 17871975.3 dated Oct. 7, 2019.

* cited by examiner

LITHIUM-SULFUR BATTERY

CROSS REFERENCE TO RELATED APPLICATIONS

This application is the National Phase of PCT International Application No. PCT/KR2017/010131, filed on Sep. 15, 2017, which claims priority under 35 U.S.C. 119(a) to and the benefit of Korean Patent Application No. 10-2016-0154858, filed on Nov. 21, 2016, the disclosure of which is incorporated herein by reference in its entirety.

TECHNICAL FIELD

The present invention relates to a high-capacity lithium-sulfur battery having improved lifespan characteristics.

BACKGROUND ART

As the development of small and lightweight electronic products, electronic devices, communication devices and the like has advanced rapidly and a need for electric vehicles has widely emerged with respect to environmental issues, there is a demand for improvement of performance of secondary batteries used as power sources for these products. Among theses, a lithium secondary battery has come into the spotlight as a high-performance battery due to a high energy density and a high reference electrode potential.

Particularly, a lithium-sulfur (Li—S) battery is a secondary battery in which a sulfur-based material having a sulfur-sulfur bond (an S—S bond) is used as a positive electrode active material and a lithium metal is used as a negative electrode active material. As a main ingredient of the positive electrode active material, sulfur has advantages in that it is abundant in resources, exhibits no toxicity, and has a low a low weight per atom.

The lithium-sulfur battery has a theoretical discharge capacity of 1,675 mAh/g-sulfur and a theoretical energy density of 2,600 Wh/kg. Therefore, the lithium-sulfur battery is the most promising battery among the batteries currently under development because the theoretical energy density of the lithium-sulfur battery is very higher than those of other battery systems (Ni-MH batteries: 450 Wh/kg, Li—FeS batteries: 480 Wh/kg, Li—$MnO_2$ batteries: 1,000 Wh/kg, and Na—S batteries: 800 Wh/kg) which have been researched so far. Accordingly, the lithium-sulfur battery has been researched as a next-generation battery using the theoretical capacity and energy density higher than those of the lithium ion batteries, and its applications is gradually expanding.

To commercialize the lithium-sulfur battery, short lifespan characteristics of the battery caused by lithium polysulfide should be most preferentially solved. That is, the lithium-sulfur battery stores and generates electrical energy using an oxidation-reduction reaction in which the oxidation number of S decreases as an S—S bond is cleaved during a reduction reaction (discharge) and the S—S bond is re-formed as the oxidation number of S increases during an oxidation reaction (charge).

$2Li+S_8$ (solid)↔$Li_2S_8$ (solution)

$2Li+Li_2S_8$ (solution)↔$2Li_2S_4$ (solution)

$2Li+Li_2S_4$ (solution)↔$2Li_2S_2$ (solution)

$2Li+Li_2S_2$ (solution)↔$2Li_2S$ (solid precipitates)

Referring to the scheme, it can be seen that lithium polysulfide is generated as a novel reaction product during an oxidation-reduction reaction between sulfur and lithium. In fact, the reactive capacity of sulfur that may be used in the lithium sulfur battery is very low at approximately 840 mAh/g, which is approximately a half of the theoretical capacity, partially due to the irreversible reaction characteristics of lithium polysulfide. As a result, the lithium sulfur batteries using sulfur as the positive electrode active material have a drawback in that the lithium sulfur batteries have low battery capacity.

Also, the lithium polysulfide has a drawback in that, as the lithium polysulfide is persistently dissolved during a discharge reaction due to high solubility in an organic electrolyte, an amount of a positive electrode material is reduced, resulting in a degraded lifespan of the battery.

Further, when a lithium metal is used as the negative electrode, a side reaction between lithium and an electrolyte may promote decomposition of the electrolyte to generate gases. Safety problems such as swelling or explosion of the may be caused due to such gases.

Therefore, there are various attempts conducted to prevent or relieve a side reaction between the electrolyte and the lithium negative electrode, a side reaction between the lithium polysulfide and the electrolyte or lithium negative electrode, and the like, wherein the side reactions cause a decrease in lifespan of the lithium-sulfur battery.

For example, methods of improving lifespan characteristics of the lithium-sulfur battery have been proposed by adding a material for adsorbing the lithium polysulfide to the separator or electrolyte, or stacking the material as a separate layer.

Such methods are somewhat effective in improving the lifespan characteristics of the lithium-sulfur battery, but have a drawback in that it is impossible to effectively solve problems caused in the negative electrode. High-loading lithium-sulfur batteries containing a large content of sulfur as the positive electrode have no satisfactory effects due to excessively generated polysulfide.

It is necessary to manufacture a high-loading electrode having a high capacity in order to enhance the energy density of the lithium-sulfur battery. The lithium-sulfur battery requires a high capacity per unit weight or efficiency per unit volume of the electrode active material, and a high packing density of the electrode active material to satisfy such high-efficiency characteristics of the lithium-sulfur battery. However, the lithium-sulfur battery meeting the requirements for the high-loading electrode may not easily produced without solving the problems regarding a decrease in the lifespan.

[Patent Document]
Patent Document 1: Korean Unexamined Patent Publication No. 2012-0135808 (Dec. 17, 2012) entitled "Lithium Sulfur Battery Comprising Polysulfide Trapping Layer"

DISCLOSURE

Technical Problem

To solve the problems regarding a decrease in lifespan of a high-loading lithium-sulfur battery, the present inventors have introduced a passivation film onto an electrode, developed a structure and composition of the passivation film so that the battery has high ion conductivity and a dense network structure, and found that, when the passivation film is introduced into the electrode of the lithium-sulfur battery, the problems regarding the lifespan of the high-loading lithium-sulfur battery, which have not been solved by the conventional passivation films, and the like, may be solved.

Accordingly, it is an object of the present invention to provide a lithium-sulfur battery having an improved lifespan.

Technical Solution

To solve the above problems, according to an aspect of the present invention, there is provided a lithium-sulfur battery including a positive electrode; a negative electrode; and a separator and an electrolyte interposed between the positive and negative electrodes, wherein the electrode coming into contact with the separator includes a passivation film having a semi-interpenetrating polymer network (semi-IPN) structure formed by a lithium ion-conductive polymer and a multifunctional cross-linking monomer containing two or more ethylenically unsaturated functional groups.

In this case, the lithium-sulfur battery may be a high-loading lithium-sulfur battery having a sulfur loading amount of 1.0 to 10.0 $mAh/cm^2$.

Advantageous Effects

A lithium-sulfur battery according to the present invention can be realized as a high-capacity battery by loading a high content of sulfur, and can be useful in solving the problems regarding a decrease in lifespan of the lithium-sulfur battery due to the passivation film, wherein the problems may be caused by a side reaction between an electrolyte and a lithium negative electrode and a side reaction between lithium polysulfide and the lithium negative electrode, both of which may occur when the conventional lithium-sulfur batteries are driven.

BEST MODE

Hereinafter, the present invention will be described in detail.

A lithium-sulfur battery is a battery including lithium as a negative electrode and sulfur as a positive electrode. For commercialization, low lifespan characteristics of the battery should be most preferentially solved. That is, a side reaction between an electrolyte and lithium ions occurs, and lifespan characteristics of the battery are degraded due to the problems such as a decrease in loading amount of sulfur caused by a reaction of the electrolyte and lithium polysulfide generated during an electrochemical reaction, a side reaction between the lithium polysulfide and a lithium negative electrode, and the like. As an alternative to solve the above problems, a passivation film is introduced, and thus an effect of improving the lifespan characteristics is somewhat achieved. However, such an effect is merely limited to low-loading lithium-sulfur batteries, and a sufficient effect is not exerted in high-loading lithium-sulfur batteries to be used in the present invention.

The term "low loading" and "high loading" disclosed in this specification are directed to a content of sulfur present per unit area. As the content of sulfur increases, it is possible to realize batteries having a higher capacity. A high-loading lithium-sulfur battery refers to a battery having a sulfur loading amount of 1.0 $mAh/cm^2$ or more. In the present invention, this means that sulfur is loaded in a range of 1.0 to 10.0 $mAh/cm^2$, preferably 3.0 to 9.5 $mAh/cm^2$.

Accordingly, a novel structure of a passivation film capable of inhibiting or preventing degradation of the lifespan characteristics of the high-loading lithium-sulfur battery is provided in the present invention. The passivation film has a structure in which a lithium ion-conductive polymer is cross-linked. In this case, the polymer is characterized by being cross-linked so that the polymer has a semi-interpenetrating polymer network (hereinafter referred to as 'semi-IPN') structure rather than a simple cross-linked structure.

The cross-linked structure is known to have an interpenetrating polymer network (IPN) structure and a semi-IPN structure. The IPN structure refers to a structure in which heterologous polymer networks are combined with each other without being bound via a covalent bond. Also, the semi-IPN structure refers to a structure in which a linear polymer and a cross-linked polymer form a network structure.

The IPN and semi-IPN structures may have robust and tough properties and exhibit superior flexibility, compared to conventional copolymers, because two polymers are bound in a chain configuration to form a network structure.

With regard to the cross-linked structure introduced into the lithium-sulfur battery, because the IPN structure has no bonds between chains, lithium ions may not migrate along a polymer, or low lithium ion conductivity may be expressed due to a slow migration velocity of the lithium ions. Therefore, the semi-IPN structure is preferred.

Particularly, the passivation film of the present invention reacts with a cross-linking monomer to achieve cross-linking for the semi-IPN structure. In this case, a material having a limited number of functional groups is used as the cross-linking monomer to form a semi-IPN passivation film having a denser structure.

The semi-IPN passivation film having a dense structure has advantages in that the semi-IPN passivation film has high lithium ion conductivity and a high coating strength due to a close distance between chains of lithium ion-conductive polymers, and delamination occurs poorly due to high adhesion to the electrode when the battery is driven.

To realize the dense structure, a multifunctional cross-linking monomer is used as a cross-linking monomer used for cross-linking when the semi-IPN passivation film is prepared according to the present invention. That is, the multifunctional cross-linking monomer contains functional groups capable of performing cross-linking in a molecular structure, that is, two or more, preferably four or more, and more preferably six or more ethylenically unsaturated functional groups. Specific types of the multifunctional cross-linking monomer may include ethylene glycol diacrylate, tetraethylene glycol diacrylate, polyethylene glycol diacrylate, 1,6-hexanediol diacrylate, 1,4-butanediol diacrylate, neopentyl glycol diacrylate, 1,3-butylene glycol diacrylate, tris(2-hydroxyethyl)isocyanate diacrylate, erythritol diacrylate, pentaerythritol diacrylate, dierythritol diacrylate, dipentaerythritol diacrylate, bis(hydroxymethyl)tricyclodecane diacrylate, bisphenol A diacrylate and derivatives thereof glycerol triacrylate, erythritol triacrylate, ditrimethylolpropane tetraacrylate, pentaerythritol tetraacrylate, dipentaerythritol pentaacrylate, dipentaerythritol hexaacrylate, tripentaerythritol octaacrylate, and the like, which may be used alone or in combination of two or more.

Preferably, ditrimethylolpropane tetraacrylate, pentaerythritol tetraacrylate, dipentaerythritol pentaacrylate, dipentaerythritol hexaacrylate, and tripentaerythritol octaacrylate, all of which contain four or more ethylenically unsaturated functional groups, are used. Most preferably, dipentaerythritol hexaacrylate is used.

A compound having two ethylenically unsaturated functional groups bound to both sides thereof is used as the cross-linking monomer used for cross-linking. The ethylene glycol diacrylate may form a semi-IPN passivation film having a dense structure, and may also form a semi-IPN passivation film having a denser structure because the cross-linking may occur at various sites when the number of the ethylenically unsaturated functional groups is greater than or equal to 4. Also, such multifunctional cross-linking monomers may also form a semi-IPN passivation film having an even denser structure because the multifunctional cross-linking monomers have a relatively short distance between cross-linking points.

That is, the terms "cross-linking degree" and "density" have different concepts, but the density may increase with an increasing content of a cross-linking agent. However, when the content of the cross-linking agent is high, the cross-linking agent itself may serve as a resistive layer, lithium ion conductivity may be reduced due to a long migration distance of lithium ions. Therefore, it is desirable that the content of the cross-linking agent is controlled.

When the semi-IPN passivation film provided in the present invention has a dense semi-IPN structure, a side reaction between the electrolyte and the lithium negative electrode, a side reaction between lithium polysulfide and the electrolyte or lithium negative electrode, and the like may be more effectively prevented even when a high content of sulfur is loaded, wherein the side reactions cause a decrease in lifespan of the lithium-sulfur battery.

The passivation film having a dense semi-IPN structure is prepared by a reaction of the multifunctional cross-linking monomer with a lithium ion-conductive polymer.

In this case, the lithium ion-conductive polymer and the multifunctional cross-linking monomer may be used at such a content that the passivation film has a dense semi-IPN structure. That is, the multifunctional cross-linking monomer is used at a content of 5 to 50 parts by weight, preferably 5 to 25 parts by weight, based on 100 parts by weight of the lithium ion-conductive polymer. When the content of the multifunctional cross-linking monomer is greater than this content range, migration of lithium ion may be inhibited due to an excessive increase in strength of the semi-IPN passivation film and an increase in density. As a result, performance of the battery may be rather degraded.

All types of lithium ion-conductive polymers known in the field of lithium-sulfur batteries may be used as the lithium ion-conductive polymer constituting the Semi-IPN passivation film.

More specifically, the lithium ion-conductive polymer may include at least one selected from the group consisting of polyethylene oxide, polypropylene oxide, polydimethylsiloxane, polyacrylonitrile, polymethyl methacrylate, polyvinyl chloride, polyvinylidene fluoride, polyvinylidene fluoride-co-hexafluoropropylene, polyethyleneimine, polyphenylene terephthalamide, polymethoxy polyethylene glycol methacrylate, poly(2-methoxy ethyl glycidyl ether), and a combination thereof. Preferably, polyethylene oxide is used.

In this case, a polyethylene oxide having a weight average molecular weight of 1,000,000 to 5,000,000 g/mol is used as the polyethylene oxide. When the molecular weight of the polyethylene oxide is less than this range, a passivation film may be dissolved due to a weak strength as the semi-IPN passivation film when the passivation film comes into contact with the electrolyte. On the other hand, the molecular weight of the polyethylene oxide is greater than this range, migration of lithium ions may be inhibited, resulting in degraded performance of the battery. Therefore, the polyethylene oxide is properly used within this range.

Also, to form a semi-IPN structure in the lithium-sulfur battery of the present invention, the lithium ion-conductive polymer includes one or more selected from the group consisting of a cross-linked copolymer, which includes a repeating unit represented by the following Formula 1 and a repeating unit represented by the following the following Formula 2; and a polyalkylene glycol and a polyacrylamide as linear polymers:

[Formula 1]

wherein $R^1$ and $R^2$ are the same or different from each other, and each independently hydrogen, or a C1 to C10 alkyl group, and $R^3$ and $R^4$ are each independently an alkali metal; and

[Formula 2]

wherein $R^5$ to $R^8$ are the same or different from each other, and each independently hydrogen, a C1 to C30 alkyl group, a C6 to C30 aryl group, or a C1 to C30 alkoxy group.

The repeating unit represented by Formula 1 may be derived from a cyclic unsaturated acid anhydride monomer such as a maleic anhydride, and the like.

In Formula 1, $R^3$ and $R^4$ may be an alkali metal, specifically lithium, sodium, potassium, rubidium, cesium, and the like. For example, $R^3$ and $R^4$ may be lithium. As such, when a copolymer having a structure in which an alkali metal is substituted for $R^3$ and $R^4$ sites in Formula 1 is used, the initial efficiency of the lithium secondary battery including the copolymer may be improved.

The content of the repeating unit represented by Formula 1 may be in a range of 40 to 90 mol %, based on the total content of the copolymer. Specifically, the content of the repeating unit may be in a range of 50 to 90 mol %, or 50 to 80 mol %.

In Formula 2, the C1 to C30 alkyl group may be particularly a C1 to C20 alkyl group, a C1 to C10 alkyl group, or a C1 to C5 alkyl group. For example, the C to C30 alkyl group may include a methyl group, ethyl group, a propyl group, and the like. The C6 to C30 aryl group may be particularly a C6 to C20 aryl group, or a C6 to C10 aryl group, and the C to C30 alkoxy group may, for example, be a C1 to C20 alkoxy group, or a C1 to C10 alkoxy group.

The repeating unit represented by Formula 2 may be derived from an olefinic monomer, an aromatic vinyl monomer, an alkyl vinyl ether monomer, and the like.

The olefinic monomer may, for example, include ethylene, propylene, butylene, isobutylene, 1-heptene, 1-decene, 1-octadecene, and the like, and the aromatic vinyl monomer may include styrene, o-ethyl styrene, m-ethyl styrene, p-ethyl styrene, α-methyl styrene, and the like. The alkyl vinyl ether monomer may include methyl vinyl ether, ethyl vinyl ether, propyl vinyl ether, butyl vinyl ether, and the like. Such monomers may be used alone or in combination thereof.

The content of the repeating unit represented by Formula 2 may be in a range of 10 to 60 mol %, based on the total content of the copolymer. Specifically, the content of the repeating unit may be in a range of 10 to 50 mol %, or 20 to 50 mol %.

The copolymers of Formulas 1 and 2 have a semi-IPN structure formed by adding a known cross-linking monomer or the aforementioned multifunctional cross-linking monomer during polymerization. Polymers having such a semi-IPN structure may be used alone as the passivation film, or may be further copolymerized with the aforementioned multifunctional cross-linking monomer containing two or more ethylenically unsaturated functional groups, and used.

As the linear polymers, the polyalkylene glycol and/or polyacrylamide may enhance flexibility of the passivation film to solve problems regarding bending or cracking of the passivation film, and may also have high adhesion to the electrode.

The polyalkylene glycol may, for example, include polymethylene glycol, polyethylene glycol, polypropylene glycol, polybutylene glycol, polyisobutylene glycol, and the like. In this case, the polyalkylene glycol may have a molecular weight of 400 to 10,000 g/mol. Specifically, the molecular weight of the polyalkylene glycol may be in a range of 400 to 9,000 g/mol, or 400 to 8,000 g/mol.

In the semi-interpenetrating polymer network, the content molar ratios of the copolymer and the linear polymer may be in a range of 1:9 to 5:5. Specifically, the content molar ratios of the copolymer and the linear polymer may be in a range of 2:8 to 5:5, and 2:8 to 4:6.

That is, the linear polymers may be included at a content of 50 to 90 mol %, preferably 50 to 80 mol %, or 60 to 80 mol %, based on the total content of the semi-interpenetrating polymer network.

Also, the semi-IPN passivation film of the present invention further includes a lithium salt to improve the lithium ion conductivity.

In this case, any types of the lithium salt may be used as long as they are used as the lithium salt in the field of batteries. Representative examples of the lithium salt may include at least one selected from the group consisting of $LiCl$, $LiBr$, $LiI$, $LiClO_4$, $LiBF_4$, $LiB_{10}Cl_{10}$, $LiPF_6$, $LiAsF_6$, $LiSbF_6$, $LiAlCl_4$, $LiSCN$, $Li(FSO_2)_2N$, lithium bis(fluorosulfonyl)imide (hereinafter referred to as 'LiFSI'), $LiCF_3CO_2$, $LiCH_3SO_3$, $LiCF_3SO_3$, $LiN(SO_2CF_3)_2$, $LiN(SO_2C_2F_5)_2$, $LiC_4F_9SO_3$, $LiC(CF_3SO_2)_3$, $(CF_3SO_2)_2NLi$, chloroboran lithium, lower aliphatic lithium carboxylate, 4-phenyl lithium borate, lithium imide, and a combination thereof. Preferably, LiFSI is used. The ion conductivity of the lithium salt varies depending on the types of the lithium salt, and ion mobility increases or decreases due to an interaction between lithium ions and polymer chains. Therefore, when PEO and LiFSI are used together, the optimum effect may be obtained.

Such a lithium salt may be used at a low or high concentration with respect to 1 M of the lithium ion-conductive polymer. For example, the lithium salt may be used at a molar ratio of 1 to 10 M, with respect to 0.01 M of the lithium ion-conductive polymer.

Also, the semi-IPN passivation film of the present invention further includes an inorganic filler to improve strength and adsorb lithium polysulfide.

The inorganic filler may include one or more selected from the group consisting of silica, alumina, titania, ceria, zirconia, and manganese oxide. Inorganic fillers having a size ranging from micrometers to nanometers may be used as such an inorganic filler. For example, various inorganic fillers having a size of 1 nm to 1 μm may be used. The inorganic filler should be uniformly distributed in the semi-IPN passivation film. In this case, when the particle size of the inorganic filler is too small, lumping between particles may occur. Also, an inorganic filler having a size greater than a thickness of the semi-IPN passivation film may not be used, and it is difficult to form a semi-IPN passivation film having a uniform surface when the particle size of the inorganic filler is too large.

The inorganic filler is preferably used at a content of 0.01 to 40 parts by weight, preferably 0.05 to 5 parts by weight, based on a total of 100 parts by weight of the semi-IPN passivation film composition. When the content of the inorganic filler is less than this content range, an effect by addition of the inorganic filler may be hardly exhibited. On the other hand, when the content of the inorganic filler is greater than this content range, it is uneconomical because mechanical properties may not be simply enhanced in proportion to the content of the inorganic filler added and fracturability of the manufactured semi-IPN passivation film may increase.

The semi-IPN passivation film provided in the present invention has a semi-IPN structure formed by allowing the lithium ion-conductive polymer to react with the cross-linking monomer. In this case, a more densified structure is formed by means of the cross-linking monomer.

The thickness of the semi-IPN passivation film having the aforementioned composition is not limited in the present invention. In this case, the semi-IPN passivation film has a thickness which does not enhance internal resistance of the battery while securing the effects. That is, the semi-IPN passivation film serves to inhibit a side reaction between the electrolyte and the lithium electrode and a side reaction between lithium polysulfide and the lithium electrode. In this case, the semi-IPN passivation film itself should not act as a resistive layer. The action as the resistive layer is affected by the composition of the semi-IPN passivation film itself, or affected by the thickness of the passivation film. Generally, the passivation film having a smaller thickness may be desirable in terms of lithium ion conductivity.

Preferably, the semi-IPN passivation film of the present invention may be formed to have a smaller thickness. Specifically, the semi-IPN passivation film may be formed with a thickness of 10 μm or less, preferably 1 to 10 μm, and more preferably 1 to 5 μm. When the thickness of the semi-IPN passivation film is less than this thickness range, the function as the semi-IPN passivation film may not be fulfilled. On the other hand, when thickness of the semi-IPN passivation film is greater than this thickness range, stable interfacial characteristics may be imparted, but an increase in internal resistance during the manufacture of the battery may be caused due to an increase in initial interfacial resistance.

The semi-IPN passivation film provided in the present invention is formed on an electrode. In this case, (i) an electrode is directly coated with the semi-IPN passivation film, or (ii) a separate semi-IPN passivation film is prepared, and then laminated on an electrode.

The preparation of the semi-IPN passivation film is not particularly limited in the present invention, and may be performed according to known methods.

For example, the semi-IPN passivation film may be prepared by adding a lithium ion-conductive monomer or a lithium ion-conductive polymer, a multifunctional cross-linking monomer, and an initiator to a solvent, coating an electrode with the resulting mixture, and curing the coated electrode. Such a method is a method useful when polyethylene glycol (PEO) is used alone. That is, ethylene glycol may be used as a monomer to perform polymerization and cross-linking, or polymerized polyethylene glycol may be used to perform cross-linking.

By way of another example, when the copolymers of Formulas 1 and 2 are used, one of the copolymers of Formulas 1 and 2 may be primarily polymerized to prepare a first polymer. Then, the first polymer may be swollen, and a monomer of the other polymer, a cross-linking agent, an initiator, and the like may be added so that a second polymer may be synthesized in the presence of the first polymer. By way of still another example, when the first polymer and the second polymer are polymerized by means of different mechanisms, a semi-IPN structure may also be formed by mixing a monomer or prepolymer of the first polymer, a monomer or prepolymer of the second polymer, and other additives, such as a cross-linking agent, an initiator, and the like, to polymerize the first polymer and the second polymer by cross-linking at the same time.

Further, the lithium salt may be added after a copolymer having a semi-IPN structure is prepared, or added during a polymerization process.

In this case, either a photoinitiator or a thermal initiator known in the related art may be used as a polymerization initiator used herein. For example, benzoin, benzoin ethyl ether, benzoin isobutyl ether, α-methyl benzoin ethyl ether, benzoin phenyl ether, acetophenone, dimethoxyphenyl acetophenone, 2,2-diethoxyacetophenone, 1,1-dichloroacetophenone, trichloroacetophenone, benzophenone, p-chlorobenzophenone, 2,4-dihydroxybenzophenone, 2-hydroxy-4-methoxybenzophenone, 2-hydroxy-2-methyl propiophenone, benzyl benzoate, benzoyl benzoate, anthraquinone, 2-ethylanthraquinone, 2-chloroanthraquinone, 2-methyl-1-(4-methylthiophenyl)-morpholinopropan-1-one, 2-hydroxy-2-methyl-1-phenylpropan-1-one (Darocure 1173 commercially available form CIba Geigy), Darocure 1116, Irgacure 907, 2-benzyl-2-dimethylamino-1-(4-morpholinophenyl)-butan-1-one, 1-hydroxycyclohexyl phenyl ketone (Irgacure 184 commercially available form CIba Geigy), Michler's ketone, benzyl dimethyl ketal, thioxanthone, isopropyl thioxanthone, chlorothioxanthone, benzyl, benzyl disulfide, butanedione, carbazole, fluorenone, and α-acyl oxime ester, and the like may be used as the photoinitiator. Peroxide (—O—O—)-based benzoyl peroxide, acetyl peroxide, dilauryl peroxide, di-tert-butylperoxide, cumyl hydroperoxide, and the like may be used as the thermal initiator. Azo-based compounds (—N=N—) such as azobisisobutyronitrile, azobisisovaleronitrile, and the like may also be used as the thermal initiator.

The content of the initiator is not particularly limited in the present invention, and the initiator preferably has a content which does not have an influence on physical properties as the semi-IPN passivation film and does not affect the electrode and the electrolyte. For example, the initiator is used at a content of 0.01 to 15 parts by weight, based on 100 parts by weight of the monomer or polymer.

Any solvent may be used as long as the solvent may be used to dissolve the lithium ion-conductive monomer or polymer, the multifunctional cross-linking monomer, and the initiator. Preferably, a non-aqueous organic solvent is used. The non-aqueous organic solvent may serve a medium through which ions participating in an electrochemical reaction in the battery may migrate. In this case, known solvents such as a carbonate-based, ester-based, ether-based, ketone-based, alcohol-based or aprotic solvent may be used as the non-aqueous organic solvent. For example, aprotic organic solvents such as N-methyl-2-pyrrolidinone, propylene carbonate, ethylene carbonate, butylene carbonate, dimethyl carbonate, diethyl carbonate, ethylmethyl carbonate, γ-butyrolactone, 1,2-dimethoxy ethane, 1,2-diethoxy ethane, tetrahydroxy franc, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, triester phosphate, trimethoxymethane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate, and the like may be used as the non-aqueous organic solvent.

The coating may be performed using methods used in conventional wet processes such as spin coating, spray coating, doctor blade coating, dip coating, and the like. However, the spin coating may be preferably performed for the purpose of coating uniformity and ease in control of coating thickness.

When necessary, drying is performed after the coating. The drying may be properly performed at a temperature greater than or equal to a boiling point of the solvent and a temperature less than or equal to a glass transition temperature ($T_g$) of a polymer material for passivation layers. A drying process may be performed to remove the solvent remaining on a surface of lithium and simultaneously improve adhesion of the polymer passivation film.

A curing reaction is performed by UV-rays or heat. Cross-linking of the multifunctional cross-linking monomer is carried out through the curing reaction.

In the lithium-sulfur battery of the present invention, the aforementioned semi-IPN passivation film serves to inhibit a side reaction between the electrolyte and the lithium metal, a side reaction between the lithium metal and the lithium polysulfide, and a side reaction between the lithium polysulfide and the electrolyte. In this case, the semi-IPN passivation film may be disposed between the negative electrode and the separator and/or between the positive electrode and the separator.

Figure 1:
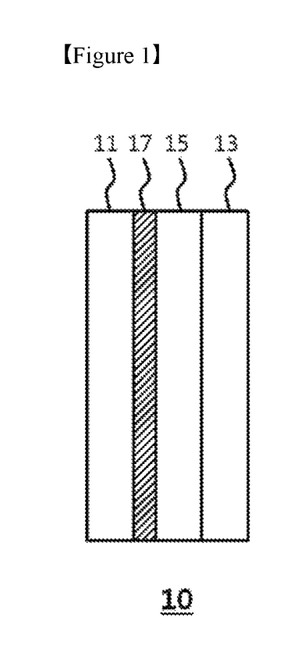
FIG. 1 is a cross-sectional view of a lithium-sulfur battery according to a first exemplary embodiment of the present invention.
Figure 2:
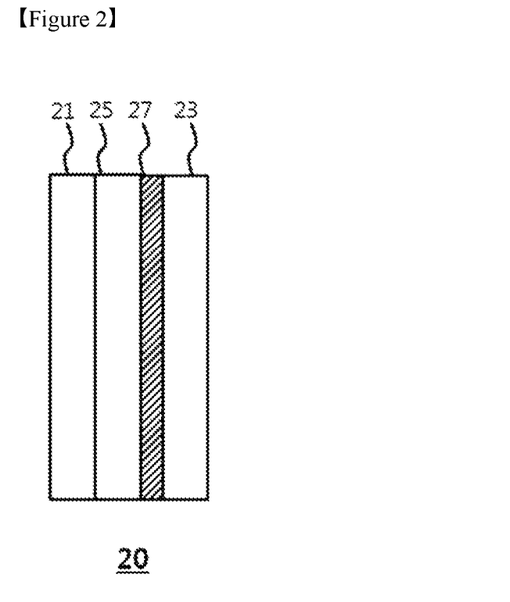
FIG. 2 is a cross-sectional view of a lithium-sulfur battery according to a second exemplary embodiment of the present invention.
Figure 3:
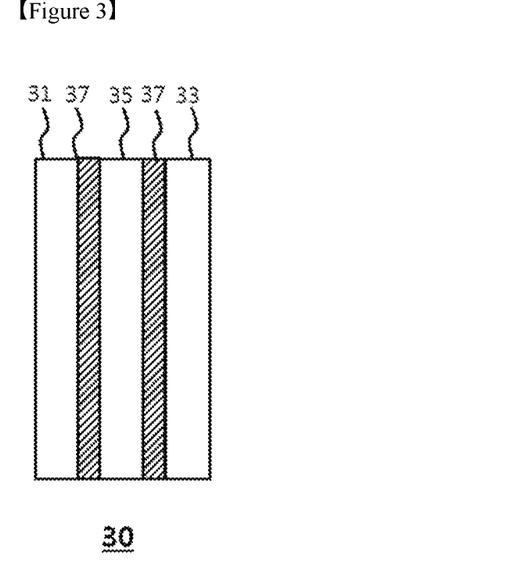
FIG. 3 is a cross-sectional view of a lithium-sulfur battery according to a third exemplary embodiment of the present invention.

FIG. 1 is a cross-sectional view of a lithium-sulfur battery according to a first exemplary embodiment of the present invention, FIG. 2 is a cross-sectional view of a lithium-sulfur battery according to a second exemplary embodiment of the present invention, and FIG. 3 is a cross-sectional view of a lithium-sulfur battery according to a third exemplary embodiment of the present invention.

The lithium-sulfur battery 10 of the first exemplary embodiment shown in FIG. 1 includes a negative electrode 11 containing lithium, a separator 15, and positive electrode 13 containing sulfur. In this case, a semi-IPN passivation film 17 is disposed between the negative electrode 11 and the separator 15.

The lithium-sulfur battery 20 of the second exemplary embodiment shown in FIG. 2 includes a negative electrode 21 containing lithium, a separator 25, and a positive electrode 23 containing sulfur. In this case, a semi-IPN passivation film 27 is disposed between the positive electrode 23 and the separator 25.

The lithium-sulfur battery 30 of the third exemplary embodiment shown in FIG. 3 includes a negative electrode 31 containing lithium, a separator 35, and a positive electrode 33 containing sulfur. In this case, semi-IPN passivation films 37 are disposed between the negative electrode 31 and the separator 35, and disposed between the positive electrode 33 and the separator 35.

Because each of the lithium-sulfur batteries having the structures as shown in FIGS. 1 to 3 includes the semi-IPN passivation film, the lithium-sulfur batteries may more effectively prevent a side reaction between the electrolyte and the lithium negative electrode, a side reaction between the lithium polysulfide and the electrolyte or lithium negative electrode, and the like, wherein the side reactions cause a decrease in lifespan of the lithium-sulfur batteries.

Each of the negative electrodes 11, 21 and 31 contains lithium, and thus has a structure in which lithium or a metal including the same is used alone or a structure in which a lithium negative electrode active material is stacked on a negative electrode current collector.

In this case, the negative electrode active material may include any one selected from the group consisting of a lithium metal, lithium alloy, lithium metal composite oxide, lithium-containing titanium composite oxide (LTO), and a combination thereof. In this case, alloys made of lithium and at least one metal selected from Na, K, Rb, Cs, Fr, Be, Mg, Ca, Sr, Ba, Ra, Al, and Sn may be used as the lithium alloy. Also, the lithium metal composite oxide may be an oxide ($MeO_x$) made of lithium and any one metal (Me) selected from the group consisting of Si, Sn, Zn, Mg, Cd, Ce, Ni, and Fe. For example, the negative electrode active material may be $Li_xFe_2O_3$ ($0 \leq x \leq 1$) or $Li_xWO_2$ ($0 < x \leq 1$).

In addition, metal composite oxides such as $SnxMe_{1-x}Me'_yO_z$ (Me: Mn, Fe, Pb, or Ge; Me': Al, B, P, Si, elements of the groups 1, 2, and 3 of the periodic table, or a halogen; $0 < x \leq 1$; $1 \leq y \leq 3$; and $1 \leq z \leq 8$), and the like; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO2_2$, $Bi_2O_3$, $Bi_2O_4$, and $Bi_2O_5$; and the like may be used as the negative electrode active material. Here, carbon-based negative electrode active materials such as crystalline carbon, amorphous carbon, or a carbon complex may be used alone or in combination of two or more.

Also, the negative electrode current collector is not particularly limited as long as the negative electrode current collector has conductivity without causing a chemical change in the lithium-sulfur batteries 10, 20 and 30. For example, copper, stainless steel, aluminum, nickel, titanium, baked carbon, or copper or stainless steel whose surface is surface-treated with carbon, nickel, titanium, silver, and the like, an aluminum-cadmium alloy, and the like may be used. Like the positive electrode current collector, the negative electrode current collector may also be used in various forms of films, sheets, foil, nets, porous materials, foams, nonwoven fabrics, and the like, all of which have fine irregularities formed on a surface thereof.

The positive electrodes 13, 23 and 33 have a structure in which a positive electrode active material containing sulfur is stacked on a positive electrode current collector.

The positive electrode active material contains sulfur (S), and thus includes elemental sulfur ($S_8$), a sulfur-based compound, or a mixture thereof. Specifically, the sulfur-based compound may include at least one selected from the group consisting of a catholyte in which solid $Li_2S_n$ ($n \geq 1$) is dissolved, an organic sulfur compound, and a carbon-sulfur polymer [$(C_2S_x)_n$, x=2.5 to 50, and $n \geq 2$].

The positive electrode current collector is not particularly limited as long as the negative electrode current collector has high conductivity without causing a chemical change in the corresponding batteries. For example, stainless steel, aluminum, nickel, titanium, baked carbon, or aluminum or stainless steel whose surface is surface-treated with carbon, nickel, titanium, silver, and the like may be used.

Each of the active materials of the negative electrodes 11, 21 and 31 or the positive electrodes 13, 23 and 33 may further include components, such as a conductive material, binder, and the like, which are generally used to manufacture the electrode.

The conductive material serves as a pathway through which electrons moves from a current collector to sulfur to impart electronic conductivity, and also serves as a pathway through which lithium ions ($Li^+$) dissolved in an electrolyte move to sulfur so that the lithium ions react with the sulfur when the positive electrode active material is electrically connected to the electrolyte.

Therefore, when an amount of the conductive material is not sufficient or the conductive material does not work properly, an unreacted portion of sulfur in the electrode increases, resulting in decreased capacity of the battery. Also, such decreased capacity of the battery also has an influence on high-rate discharge characteristics and charge/discharge cycle lifespan. Therefore, it is necessary to properly add the conductive material. The conductive material is preferably properly added at a content of 0.01 to 30% by weight, based on the total weight of the positive electrode composition.

The conductive material has conductivity without causing a chemical change in the corresponding batteries. For example, graphite; carbon blacks such as Denka black, acetylene black, ketjen black, channel black, furnace black, lamp black, thermal black, and the like; conductive fibers such as a carbon fiber, a metal fiber, and the like; metal powders such as hydrofluorocarbon, aluminum, nickel powder, and the like; conductive whiskers such as zinc oxide, potassium titanate, and the like; conductive metal oxides such as titanium oxide, and the like; conductive materials such as a polyphenylene derivative, and the like may be used. Specific examples of commercially available conductive materials that may be used herein may include acetylene black-based products (Chevron Chemical Company) or Denka black (Denka Singapore Private Limited), products from Gulf Oil Company, ketjen black, EC-based products (Armak Company), Vulcan XC-72 products (Cabot Company), and Super-P (commercially available from Timcal).

The binder is a component that aid in binding a conductive material to an active material and binding to a current collector. Generally, the binder is added at a content of 1 to 50% by weight, based on the total weight of the mixture including the electrode active material. When the content of the binder resin is less than 1% by weight, physical properties of the positive electrode may be degraded so that the positive electrode active material and the conductive material may be detached. On the other hand, when the content of the binder resin is greater than 50% by weight, the capacity of the battery may be reduced due to a relative decrease in ratio of the active material and the conductive material in the positive electrode.

The binder applicable to the present invention may include all types of binders known in the related art. Specifically, the binder may include at least one selected from the group consisting of a fluoride resin-based binder including polyvinylidene fluoride (PVdF) or polytetrafluoroethylene (PTFE); a rubber-based binder including a styrene-butadiene rubber, an acrylonitrile-butadiene rubber, or a styrene-isoprene rubber; a cellulose-based binder including carboxymethyl cellulose (CMC), starch, hydroxypropyl cellulose, or regenerated cellulose; a poly alcohol-based binder; a polyolefinic binder including polyethylene or polypropylene; a polyimide-based binder; a polyester-based binder; a silane-based binder; and a mixture or copolymer of two or more, but the present invention is not limited thereto.

The filler is not particularly limited as long as the filler is a fibrous material without causing a chemical change in the corresponding batteries. For example, olefinic polymers such as polyethylene, polypropylene, and the like; fibrous materials such as a glass fiber, a carbon fiber, and the like are used.

In the lithium-sulfur batteries of the present invention, the separators 15, 25 and 35 are physical separators 15, 25 and 35 that serve to physically separate the electrodes. In this case, the separators 15, 25 and 35 may be used without particular limitation as long as the separators 15, 25 and 35 are used as conventional separators. In particular, the separators exhibiting low resistance to ion migration of the electrolyte and having excellent electrolyte impregnation ability are preferred.

Also, the separators 15, 25 and 35 may serve to transfer lithium ions between the positive electrode and the negative electrode while separating or isolating the positive electrode and the negative electrode from each other. Such separators 15, 25 and 35 may be formed of a porous and non-conductive or insulating material.

The separators 15, 25 and 35 may be separate members such as films, or may be coating layers added to the positive electrodes 13, 23 and 33 and/or the negative electrodes 11, 21 and 31.

Specifically, porous polymer films, for example, porous polymer films prepared using a polyolefinic polymer such as an ethylene homopolymer, a propylene homopolymer, an ethylene/butene copolymer, an ethylene/hexene copolymer, and an ethylene/methacrylate copolymer may be used alone or as a stack thereof. Also, conventional porous nonwoven fabrics, for example, nonwoven fabrics made of a high-melting-point glass fiber, a polyethylene terephthalate fiber, and like may be used, but the present invention is not limited thereto.

In the lithium-sulfur battery according to the present invention, the electrolyte is a non-aqueous electrolyte containing a lithium salt, and includes a lithium salt and an electrolyte. In this case, a non-aqueous organic solvent, an organic solid electrolyte, and an inorganic solid electrolyte are used as the electrolyte.

In this case, the lithium salt is a material that is easily dissolved in a non-aqueous organic solvent, and may, for example, include one or more selected from the group consisting of LiCl, LiBr, LiI, $LiClO_4$, $LiBF_4$, $LiB_{10}Cl_{10}$, $LiB(Ph)_4$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, LiSCN, $LiC(CF_3SO_2)_3$, $LiN(CF_3SO_2)_2$, chloroboran lithium, lower aliphatic lithium carboxylate, 4-phenyl lithium borate, lithium imide, and the like.

The concentration of the lithium salt may be in a range of 0.2 to 2 M, particularly 0.6 to 2 M, and more particularly 0.7 to 1.7M, depending on various factors such as an exact composition of an electrolyte mixture, the solubility of a salt, the conductivity of a dissolved salt, the charge and discharge conditions for batteries, a working temperature, and other factors known in the field of lithium batteries. When the lithium salt is used at a concentration of less than 0.2 M, performance of the electrolyte may be deteriorated due to a decrease in conductivity of the electrolyte. On the other hand, when the concentration of the lithium salt is greater than 2 M, mobility of lithium ion ($Li^+$) may be reduced due to an increase in viscosity of the electrolyte.

The non-aqueous organic solvent should serve to promote dissolution of the lithium salt. In this case, aprotic organic solvents such as N-methyl-2-pyrrolidinone, propylene carbonate, ethylene carbonate, butylene carbonate, dimethyl carbonate, diethyl carbonate, ethylmethyl carbonate, γ-butyrolactone, 1,2-dimethoxy ethane, 1,2-diethoxy ethane, tetrahydroxy franc, 2-methyl tetrahydrofuran, dimethylsulfoxide, 1,3-dioxolane, 4-methyl-1,3-dioxene, diethylether, formamide, dimethyl formamide, dioxolane, acetonitrile, nitromethane, methyl formate, methyl acetate, triester phosphate, trimethoxymethane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate, and the like may, for example, be used as the non-aqueous organic solvent of the present invention. In this case, the organic solvent may be a single organic solvent or a mixture of two or more organic solvents.

For example, a polyethylene derivative, a polyethylene oxide derivative, a polypropylene oxide derivative, a phosphate ester polymer, polyagitation lysine, polyester sulfide, polyvinyl alcohol, polyvinylidene fluoride, a polymer containing an ionic dissociation group, and the like may be used as the organic solid electrolyte.

For example, nitrides, halides, sulfates, and the like of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like, may be used as the inorganic solid electrolyte of the present invention.

The lithium-sulfur battery according to the present invention may be manufactured by laminating (stacking) a separator and an electrode and folding the separator and the electrode in addition to general processes such as winding. Also, the battery case may be in a cylindrical shape, a prismatic shape, pouch-type shape, or a coin-type shape.

MODE FOR INVENTION

Hereinafter, preferred embodiments of the present invention will be described in order to describe the present invention in detail. However, it should be understood that the description proposed herein is just a preferable example for the purpose of illustrations only. Therefore, it will be apparent to those skilled in the art that various changes and modifications can be made to the exemplary embodiments of the present invention without departing from the scope of the present invention, so it should be understood that the present invention covers all such changes and modifications provided they are within the scope of the appended claims and their equivalents.

EXAMPLES

Example 1: Manufacture of Lithium-Sulfur Battery (1) Preparation of Passivation Film with Semi-IPN Structure PEO (Mv: approximately 4,000,000 g/mol) and LiFSI were dissolved in acetonitrile, and then mixed at EO/Li=20/1 (molar ratio). Dipentaerythritol hexaacrylate (DPEHA) serving as a multifunctional cross-linking monomer and benzoyl peroxide (BPO) serving as an initiator were added thereto, and mixed so that the content of PEO20-LiFSI was 3% by weight. Thereafter, the mixed solution was stirred until the solution was uniformly mixed. In this case, the BPO was mixed so that the content of DPEHA was 1% by weight.

The resulting solution was cast on a glass substrate, and then vacuum-dried at room temperature to completely remove the solvent. Thereafter, a semi-IPN passivation film having a thickness of 2.5 μm was prepared by during the solution at 80° C. for 12 hours so that no unreacted acrylate was left behind.

(2) Manufacture of High-Loading Sulfur-Containing Positive Electrode

A sulfur/carbon nanotube complex, carbon black, and a binder (SBR/CMC) were mixed at a weight ratio of 92:5:5 to prepare slurry, and the slurry was then subjected to film formation in order to manufacture a positive electrode. In this case, a loading amount of sulfur in the positive electrode was 5.0 mAh/cm².

(3) Manufacture of Lithium-Sulfur Battery

Lithium metal foil having a thickness of 40 μm, and the semi-IPN passivation film prepared in the step (1) were laminated on copper foil to manufacture a negative electrode.

An electrode assembly, in which a polyolefinic porous film was interposed between the negative electrode and the positive electrode manufactured in the step (2), was inserted into a pouch-type battery case, and a non-aqueous electrolyte (1 M LiTFSI, DOL:DME=1:1 (volume ratio), LiNO₃) was then injected into the battery case. Thereafter, the battery case was completely sealed to manufacture a lithium-sulfur battery.

Example 2: Manufacture of Lithium-Sulfur Battery

A lithium-sulfur battery was manufactured in the same manner as in Example 1, except that a location of the semi-IPN passivation film was changed. Specifically, the semi-IPN passivation film prepared in the step (1) was disposed on a positive electrode to manufacture a lithium-sulfur battery in which a lithium negative electrode, a separator, the semi-IPN passivation film, and a sulfur positive electrode were sequentially stacked.

Example 3: Manufacture of Lithium-Sulfur Battery

A lithium-sulfur battery was manufactured in the same manner as in Example 1, except that a location of the semi-IPN passivation film was changed.

Specifically, the semi-IPN passivation film prepared in the step (1) was disposed on a positive electrode to manufacture a lithium-sulfur battery in which a lithium negative electrode, the semi-IPN passivation film, a separator, the semi-IPN passivation film, and a sulfur positive electrode were sequentially stacked.

Example 4: Manufacture of Lithium-Sulfur Battery

A lithium-sulfur battery was manufactured in the same manner as in Example 1, except that ethylene glycol diacrylate was used as the cross-linking monomer instead of the dipentaerythritol hexaacrylate.

Example 5: Manufacture of Lithium-Sulfur Battery

A lithium-sulfur battery was manufactured in the same manner as in Example 1, except that ditrimethylolpropane tetraacrylate was used as the cross-linking monomer instead of the dipentaerythritol hexaacrylate.

Comparative Example 1: Manufacture of Lithium-Sulfur Battery

A lithium-sulfur battery was manufactured in the same manner as in Example 1, except that the passivation film was not used.

Experimental Example 1: Evaluation of Performance of Lithium-Sulfur Batteries To evaluate lifespan characteristics of the lithium-sulfur batteries manufactured in Examples and Comparative Example, a charge/discharge test was performed under a condition of a voltage of 3 V to 1.5 V (charged and discharged 50 times). The lifespan characteristics were evaluated from a discharge capacity retention rate. Here, the discharge capacity retention rate was determined by expressing the capacity after repeated charge and discharge as a percentage (%) with respect to the initial capacity. The results are listed in the following Table 1 and shown in FIG. 4.

The discharge capacity retention rate was determined by expressing the capacity after a battery was repeatedly charged and discharged as a percentage (%) with respect to the initial capacity. Also, the Coulombic efficiency was determined in the same manner as in the aforementioned measurement of the discharge capacity retention rate. In this case, the Coulombic efficiency (%) is obtained by calculating, as a percentage (%), the capacity of a discharge battery with respect to the capacity of the charged battery.

TABLE 1

| | Charge/discharge capacity | | |
|---|---|---|---|
| | Initial (mAh) | Discharge capacity retention rate (%) after 50 cycles/Relative value (%) | Coulombic efficiency |
| Example 1 | 1,030 | 62%/93% | 98% |
| Example 2 | 620 | 100%/84% | 96% |
| Example 3 | 580 | 95%/90% | 97% |
| Example 4 | 1,050 | 60%/90% | 95% |
| Example 5 | 1,050 | 59%/91% | 97% |
| Comparative Example 1 | 1,070 | 10%/— | 10% |

Looking at Table 2, it can be seen that the lithium-sulfur batteries had a capacity retention rate of at least 90% or more with respect to the initial capacity even after 50 cycles when the lithium-sulfur batteries included the semi-IPN passivation film according to the present invention, but the battery of Comparative Example 1 had a significantly reduced capacity.

Figure 4:
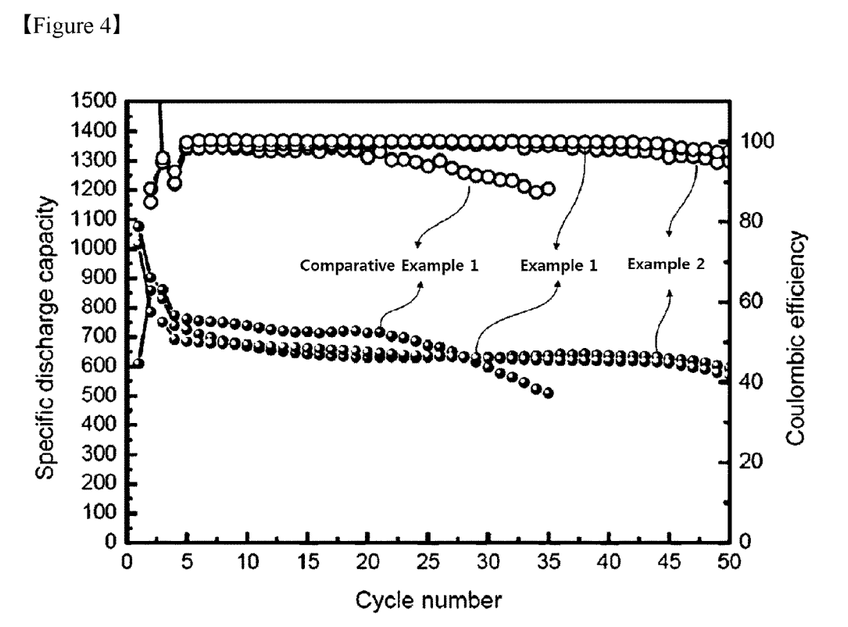
FIG. 4 is a graph illustrating changes in battery capacity and battery efficiency of lithium-sulfur batteries manufactured in Examples 1 and 2 and Comparative Example 1 according to the cycle number of the batteries.

These results can be specifically checked through the graph. FIG. 4 is a graph illustrating changes in battery capacity and battery efficiency of lithium-sulfur batteries manufactured in Examples 1 and 2 and Comparative Example 1 according to the cycle number of the batteries.

Referring to FIG. 4, a decline in capacity and Coulombic efficiency was caused after approximately 20 cycles in the case of the lithium-sulfur battery having no passivation film. In comparison, the batteries of Examples 1 and 2 showed the stable results even after 50 cycles.

These results showed that the batteries of Example 3 to 5 had the same patterns. Particularly, it can be seen that the characteristics such as a capacity retention rate were further improved as the number of ethylenically unsaturated functional groups at the same content increased in the case of Examples 2, 4 and 5.

INDUSTRIAL APPLICABILITY

The lithium-sulfur battery according to the present invention can be applied as a high-capacity high-output battery in various technical fields.

The invention claimed is:

1. A lithium-sulfur battery, comprising:
a positive electrode;
a negative electrode;
a separator and
an electrolyte interposed between the positive and negative electrodes,
wherein the positive electrode contacts the separator;
wherein a passivation film is disposed directly on the positive electrode coming into contact with the separator;
wherein the passivation film comprises a semi-interpenetrating polymer network (semi-IPN) structure, wherein the semi-IPN structure comprises a linear polymer and a lithium ion-conductive polymer;
further wherein the lithium ion-conductive polymer is crosslinked with a multifunctional cross-linking monomer containing two or more ethylenically unsaturated functional groups; and
wherein the multifunctional cross-linking monomer is used at a content of 5 to 50 parts by weight, based on 100 parts by weight of the lithium ion-conductive polymer.

2. The lithium-sulfur battery of claim 1, wherein the lithium-sulfur battery is a high-loading lithium-sulfur battery having a sulfur loading amount of 1.0 to 10.0 mAh/cm².

3. The lithium-sulfur battery of claim 1, wherein the multifunctional cross-linking monomer comprises at least one selected from the group consisting of ethylene glycol diacrylate, tetraethylene glycol diacrylate, polyethylene glycol diacrylate, 1,6-hexanediol diacrylate, 1,4-butanediol diacrylate, neopentyl glycol diacrylate, 1,3-butylene glycol diacrylate, tris(2-hydroxyethyl)isocyanate diacrylate, erythritol diacrylate, pentaerythritol diacrylate, dierythritol diacrylate, dipentaerythritol diacrylate, bis(hydroxymethyl)tricyclodecane diacrylate, bisphenol A diacrylate and derivatives thereof, glycerol triacrylate, erythritol triacrylate, ditrimethylolpropane tetraacrylate, pentaerythritol tetraacrylate, dipentaerythritol pentaacrylate, dipentaerythritol hexaacrylate, and tripentaerythritol octaacrylate.

4. The lithium-sulfur battery of claim 1, wherein the multifunctional cross-linking monomer contains four or more ethylenically unsaturated functional groups.

5. The lithium-sulfur battery of claim 1, wherein the passivation film comprises the multifunctional cross-linking monomer at a content of 5 to 25 parts by weight, based on 100 parts by weight of the lithium ion-conductive polymer.

6. The lithium-sulfur battery of claim 1, wherein the lithium ion-conductive polymer comprises at least one selected from the group consisting of polyethylene oxide, polypropylene oxide, polydimethylsiloxane, polyacrylonitrile, polymethyl methacrylate, polyvinyl chloride, polyvinylidene fluoride, polyvinylidene fluoride-co-hexafluoropropylene, polyethyleneimine, polyphenylene terephthalamide, polymethoxy polyethylene glycol methacrylate, and poly(2-methoxy ethyl glycidyl ether).

7. The lithium-sulfur battery of claim 1, wherein the lithium ion-conductive polymer comprises one or more selected from the group consisting of a cross-linked copolymer, which comprises a repeating unit represented by the following Formula 1 and a repeating unit represented by the following Formula 2; and a polyalkylene glycol and a polyacrylamide as linear polymers:

[Formula 1]

wherein $R^1$ and $R^2$ are the same or different from each other, and each independently hydrogen, or a C1 to C10 alkyl group, and $R^3$ and $R^4$ are each independently an alkali metal; and

[Formula 2]

wherein $R^5$ to $R^8$ are the same or different from each other, and each independently hydrogen, a C1 to C30 alkyl group, a C6 to C30 aryl group, or a C1 to C30 alkoxy group.

8. The lithium-sulfur battery of claim 1, wherein the passivation film further comprises a lithium salt.

9. The lithium-sulfur battery of claim 1, wherein a second passivation film is formed on the negative electrode coming into contact with the separator.

10. The lithium-sulfur battery of claim 1, wherein the passivation film has a thickness of 1 to 10 μm.

11. The lithium-sulfur battery of claim 1, wherein the passivation film comprises one or more inorganic fillers selected from the group consisting of silica, alumina, titania, ceria, zirconia, and manganese oxide.

* * * * *